(12) United States Patent
Duyvesteyn

(10) Patent No.: US 8,449,763 B2
(45) Date of Patent: May 28, 2013

(54) NOZZLE REACTOR AND METHOD OF USE

(75) Inventor: Willem P. C. Duyvesteyn, Reno, NV (US)

(73) Assignee: Marathon Canadian Oil Sands Holding Limited (CA)

( * ) Notice: Subject to any disclaimer, the term of this patent is extended or adjusted under 35 U.S.C. 154(b) by 487 days.

(21) Appl. No.: 12/761,204

(22) Filed: Apr. 15, 2010

(65) Prior Publication Data
US 2010/0264062 A1 Oct. 21, 2010

Related U.S. Application Data

(60) Provisional application No. 61/169,569, filed on Apr. 15, 2009.

(51) Int. Cl.
*C10G 9/38* (2006.01)
(52) U.S. Cl.
USPC ........... 208/125; 208/106; 208/128; 208/129; 208/130; 422/139; 422/220; 156/345.33; 427/213; 48/127.7; 48/180.1; 48/189.4; 48/198.8
(58) Field of Classification Search
USPC .................. 208/106, 128–130; 422/139, 194, 422/220; 156/345.33; 427/213; 261/19–20, 261/75–76, 115, 118
See application file for complete search history.

(56) References Cited

U.S. PATENT DOCUMENTS

| | | |
|---|---|---|
| 3,079,327 A | 2/1963 | Keith et al. |
| 3,565,593 A | 2/1971 | Moore |
| 3,565,594 A | 2/1971 | Moore et al. |
| 3,565,968 A | 2/1971 | Moore |
| 3,692,859 A | 9/1972 | Cottle |
| 3,779,902 A | 12/1973 | Mitchell et al. |
| 3,951,778 A | 4/1976 | Willard, Sr. |
| 4,035,282 A | 7/1977 | Stuchberry et al. |
| 4,046,668 A | 9/1977 | Farcasiu et al. |
| 4,120,777 A | 10/1978 | Globus |
| 4,139,450 A | 2/1979 | Hanson et al. |
| 4,308,133 A | 12/1981 | Meyer |
| 4,320,091 A | 3/1982 | Irvin |
| 4,347,118 A | 8/1982 | Funk et al. |

(Continued)

FOREIGN PATENT DOCUMENTS

| | | |
|---|---|---|
| CA | 2224615 | 6/1999 |
| JP | 2005307104 | 11/2005 |
| WO | WO 2007/102819 | 9/2007 |

OTHER PUBLICATIONS

Schneider, D.F. et al. (1997) Deep Cut Vacuum Tower Incentives for Various Crudes, Stratus Engineering, Inc., League City, TX, 21 pgs. (Complete document available at http://www.stratusengr.com/Articles/DeepCut.pdf).*

(Continued)

*Primary Examiner* — Brian McCaig
(74) *Attorney, Agent, or Firm* — Holland & Hart LLP

(57) ABSTRACT

Embodiments of a nozzle reactor of the type useable to inject a first material feed stock and a second material feed stock to cause interaction between the first material feed stock and second material feed stock are described herein. According to some embodiments, the nozzle reactor may crack residual oil produced by other processing units in a refinery process. Furthermore, nozzle reactors may replace traditional processing units of a refinery process, such as cokers, hydrocrackers and deasphalting units.

10 Claims, 6 Drawing Sheets

U.S. PATENT DOCUMENTS

| | | | |
|---|---|---|---|
| 4,427,537 A | 1/1984 | Dean et al. | |
| 4,490,259 A | 12/1984 | Coffing | |
| 4,589,980 A | 5/1986 | Keys | |
| 4,596,651 A | 6/1986 | Wolff et al. | |
| 4,612,113 A | 9/1986 | Kallionen | |
| 4,678,561 A | 7/1987 | Keys | |
| 4,678,562 A | 7/1987 | Keys | |
| 4,724,272 A | 2/1988 | Raniere et al. | |
| 4,744,890 A | 5/1988 | Miller et al. | |
| 4,859,317 A | 8/1989 | Shelfantook et al. | |
| 4,900,454 A | 2/1990 | Hedlund et al. | |
| 5,044,552 A | 9/1991 | Becker et al. | |
| 5,108,583 A | 4/1992 | Keon | |
| 5,143,598 A | 9/1992 | Graham et al. | |
| 5,176,802 A | 1/1993 | Duyvesteyn et al. | |
| 5,188,805 A | 2/1993 | Sabottke | |
| 5,223,148 A | 6/1993 | Tipman et al. | |
| 5,236,577 A | 8/1993 | Tipman et al. | |
| 5,254,325 A | 10/1993 | Yamasaki et al. | |
| 5,328,591 A | 7/1994 | Raterman | |
| 5,389,274 A | 2/1995 | Fernandez | |
| 5,443,158 A | 8/1995 | McKenney et al. | |
| 5,464,503 A | 11/1995 | Avetisian et al. | |
| 5,485,883 A | 1/1996 | Rippetoe et al. | |
| 5,538,081 A | 7/1996 | Rippetoe et al. | |
| 5,554,301 A | 9/1996 | Rippetoe et al. | |
| 5,565,090 A | 10/1996 | Gosling et al. | |
| 5,624,642 A | 4/1997 | Devanathan et al. | |
| 5,626,743 A | 5/1997 | Humphreys | |
| 5,670,056 A | 9/1997 | Yoon et al. | |
| 5,673,859 A | 10/1997 | Haruch | |
| 5,702,612 A | 12/1997 | Wang | |
| 5,705,722 A | 1/1998 | Monnier et al. | |
| 5,795,466 A | 8/1998 | Kelebek et al. | |
| 5,798,137 A | 8/1998 | Lord et al. | |
| 5,849,201 A | 12/1998 | Bradley | |
| 5,876,592 A | 3/1999 | Tipman et al. | |
| 5,896,435 A | 4/1999 | Gautier et al. | |
| 5,961,786 A | 10/1999 | Freel et al. | |
| 5,968,349 A | 10/1999 | Duyvesteyn et al. | |
| 6,007,709 A | 12/1999 | Duyvesteyn et al. | |
| 6,036,849 A | 3/2000 | Rippetoe et al. | |
| 6,042,717 A | 3/2000 | Radcliffe et al. | |
| 6,074,558 A | 6/2000 | Duyvesteyn et al. | |
| 6,106,787 A | 8/2000 | Rippetoe | |
| 6,214,213 B1 | 4/2001 | Tipman et al. | |
| 6,320,148 B1 | 11/2001 | Yoon et al. | |
| 6,352,639 B2 | 3/2002 | Ito et al. | |
| 6,427,843 B1 | 8/2002 | Clark | |
| 6,514,310 B2 | 2/2003 | Allemand et al. | |
| 6,589,417 B2 | 7/2003 | Taciuk et al. | |
| 6,595,163 B2 | 7/2003 | Dumaz et al. | |
| 6,667,348 B2 | 12/2003 | Chang et al. | |
| 6,793,079 B2 | 9/2004 | Khan et al. | |
| 6,821,500 B2 | 11/2004 | Fincke | |
| 6,827,786 B2 | 12/2004 | Lord | |
| 6,835,360 B2 | 12/2004 | Warren | |
| 6,855,838 B2 | 2/2005 | Haas et al. | |
| 6,871,743 B2 | 3/2005 | Yoon et al. | |
| 6,887,283 B1 | 5/2005 | Ginosar et al. | |
| 6,906,164 B2 | 6/2005 | DeBruin | |
| 6,916,964 B2 | 7/2005 | Gobbel et al. | |
| 6,936,227 B1 | 8/2005 | De Souze et al. | |
| 6,989,091 B2 | 1/2006 | Jorgensen | |
| 7,008,528 B2 | 3/2006 | Mitchell et al. | |
| 7,011,749 B2 | 3/2006 | Hayes et al. | |
| 7,018,435 B1 | 3/2006 | Wentinck | |
| 7,097,675 B2 | 8/2006 | Detering et al. | |
| 7,195,747 B2 | 3/2007 | Vanden Bussche et al. | |
| 7,381,320 B2 | 6/2008 | Iqbal et al. | |
| 7,384,557 B2 | 6/2008 | Phillips et al. | |
| 7,585,407 B2 | 9/2009 | Duyvesteyn | |
| 7,618,597 B2 | 11/2009 | Duyvesteyn et al. | |
| 7,811,444 B2 | 10/2010 | Duyvesteyn et al. | |
| 7,824,453 B2 | 11/2010 | Duyvesteyn | |
| 7,888,542 B2 | 2/2011 | Koivasalmi et al. | |
| 7,909,989 B2 | 3/2011 | Duyvesteyn et al. | |
| 7,927,565 B2 | 4/2011 | Duyvesteyn et al. | |
| 7,988,847 B2 | 8/2011 | Duyvesteyn et al. | |
| 2004/0065589 A1* | 4/2004 | Jorgensen | 208/130 |
| 2005/0070218 A1 | 3/2005 | Phillips et al. | |
| 2006/0144760 A1* | 7/2006 | Duyvesteyn et al. | 208/128 |
| 2007/0131579 A1* | 6/2007 | Koivusalmi et al. | 208/19 |
| 2007/0170095 A1 | 7/2007 | Freel et al. | |
| 2008/0156702 A1 | 7/2008 | Duyvesteyn | |
| 2008/0210602 A1 | 9/2008 | Duyvesteyn | |
| 2008/0242875 A1 | 10/2008 | Hong et al. | |
| 2009/0145809 A1 | 6/2009 | Ledbetter et al. | |
| 2009/0294332 A1 | 12/2009 | Ryu | |
| 2010/0059411 A1 | 3/2010 | Satchell, Jr. | |
| 2010/0264062 A1 | 10/2010 | Duyvesteyn | |
| 2011/0017642 A1 | 1/2011 | Duyvesteyn | |
| 2011/0084000 A1 | 4/2011 | Duyvesteyn et al. | |

OTHER PUBLICATIONS

International Search Report, PCT/US2011/022206, Oct. 20, 2011 (3 pp.).

Hong et al., "A Polar-Nonpolar, Acetic Acid/Heptane, Solvent Medium for Degradation of Pyrene by Ozone," Ind. Eng. Chem. Res. 43:7710-7715, 2004 (6 pp.).

Houdaille, "Jet Pump Technical Data—Pumping Liquids," pp. 1-11, 1982 (12 pp.).

International Search Report and Written Opinion, PCT/US2005/34092, Jul. 26, 2007 (6 pp.).

International Search Report and Written Opinion, PCT/US2006/08263, Oct. 23, 2006 (5 pp.).

International Search Report and Written Opinion, PCT/US2005/36728, Aug. 8, 2005 (8 pp.).

International Search Report, PCT/US2010/31260, Jun. 9, 2010 (3 pp.).

International Search Report and Written Opinion, PCT/US2010/42327, Sep. 1, 2010 (9 pp.).

International Search Report, PCT/US2010/043093, Sep. 13, 2010 (3 pp.).

U.S. Appl. No. 13/292,747, filed Nov. 9, 2011, Heavy Hydrocarbon Reactor.

U.S. Appl. No. 13/227,470, filed Sep. 7, 2011, Nozzle Reactor and Method of Use.

International Search Report, PCT/US2012/033013, Oct. 31, 2012 (5 pp.).

U.S. Appl. No. 13/666,108, filed Nov. 1, 2012, Systems and Methods for Integrating Bitumen Extraction with Bitumen Upgrading.

U.S. Appl. No. 13/662,939, filed Oct. 29, 2012, Nozzle Reactor Systems and Methods of Use.

U.S. Appl. No. 13/652,132, filed Oct. 15, 2012, Methods and Systems for Upgrading Hydrocarbon.

International Search Report, PCT/US2011/057585, May 30, 2012 (3 pp.).

Axelsson, H. et al., Centrifuges, Sedimenting, pp. 1-6, Jul. 15, 2006 (6 pp.).

U.S. Appl. No. 13/589,927, filed Aug. 20, 2012, Upgrading Hydrocarbon Material on Offshore Platforms.

U.S. Appl. No. 13/532,453, filed Jun. 25, 2012, Methods and Systems for Upgrading Hydrocarbon Residuum.

U.S. Appl. No. 12/911,409, filed Oct. 25, 2010, Method for Making Biofuels and Biolubricants.

U.S. Appl. No. 12/816,844, filed Jun. 16, 2010, Dual Reactor for Better Conversion of Heavy Hydrocarbons.

U.S. Appl. No. 12/749,068, filed Mar. 29, 2010, Nozzle Reactor and Method of Use.

U.S. Appl. No. 12/695,885, filed Jan. 28, 2010, Methods for Preparing Solid Hydrocarbons for Cracking.

* cited by examiner

NOZZLE REACTOR AND METHOD OF USE

This application claims priority to U.S. Provisional Application No. 61/169,569, filed Apr. 15, 2009, and hereby incorporated by reference.

BACKGROUND

Some nozzle reactors operate to cause interactions between materials and achieve alteration of the physical or chemical composition of one or more of the materials. Such interaction and alteration typically occurs by injecting the materials into a reactor chamber in the nozzle reactor. The manner in which the materials are injected into the reactor chamber and the configuration of the various components of the nozzle reactor may both contribute to how the materials interact and what types of alterations are achieved.

U.S. Pat. No. 7,618,597 describes various configurations for a nozzle reactor wherein the cracking material and the material to be cracked are injected into the reactor chamber of the nozzle reactor at approximately transverse directions. Additionally, the nozzle reactors described in the '597 patent describe a cracking material injection pathway capable of accelerating the cracking material to a supersonic speed as it enters the reactor chamber. These features of the disclosed nozzle reactors, along with additional features, can help to achieve increased conversion rates of material to be cracked injected into the nozzle reactor. Additionally, these features can help to ensure that the material to be cracked is sufficiently altered (e.g., broken down into smaller compounds having a sufficiently low molecular weight for the desired product).

The '597 primarily contemplates methods wherein the nozzle reactor is utilized to crack bitumen feed stream. However, obtaining a bitumen stream, or even a material stream that is primarily bitumen, can prove to be difficult. Several processing steps often must take place in order to isolate bitumen from, e.g., oil sands, which would thereby increase the cost of performing the bitumen cracking methods described in the '597 patent. Additionally, the ability to use the nozzle reactor cracking method described in the '597 patent with other types of material streams, including material streams of traditionally less valuable hydrocarbon material, would be a highly desirable feature.

BRIEF SUMMARY

Disclosed below are representative embodiments that are not intended to be limiting in any way. Instead, the present disclosure is directed toward features, aspects, and equivalents of the embodiments of the nozzle reactor and method of use described below. The disclosed features and aspects of the embodiments can be used alone or in various combinations and sub-combinations with one another.

In some embodiments, a method of cracking residual oil is disclosed. The method includes the steps of providing a nozzle reactor, injecting a stream of cracking material into the reactor body of the nozzle reactor, and injecting residual oil into the reactor body and transverse to the stream of cracking material entering the reactor body to produce cracked residual oil and uncracked residual oil.

In some embodiments, a feed material cracking method is disclosed. The method includes the steps of injecting a stream of cracking material through a cracking material injector into a reaction chamber, and injecting residual oil into the reaction chamber adjacent to the cracking material injector and traverse to the stream of cracking material entering the reaction chamber from the cracking material injector.

In some embodiments, a method of modifying a refinery plant including at least one of a coker, a hydrocracker, and a deasphalting unit is disclosed. The method includes the step of replacing at least one of the coker, hydrocracker, and deasphalting unit with a nozzle reactor.

The foregoing and other features and advantages of the present application will become apparent from the following detailed description, which proceeds with reference to the accompanying figures. It is thus to be understood that the scope of the invention is to be determined by the claims as issued and not by whether a claim includes any or all features or advantages recited in this Brief Summary or addresses any issue identified in the Background

BRIEF DESCRIPTION OF THE DRAWINGS

The preferred and other embodiments are disclosed in association with the accompanying drawings in which.

DETAILED DESCRIPTION

Figure 1:
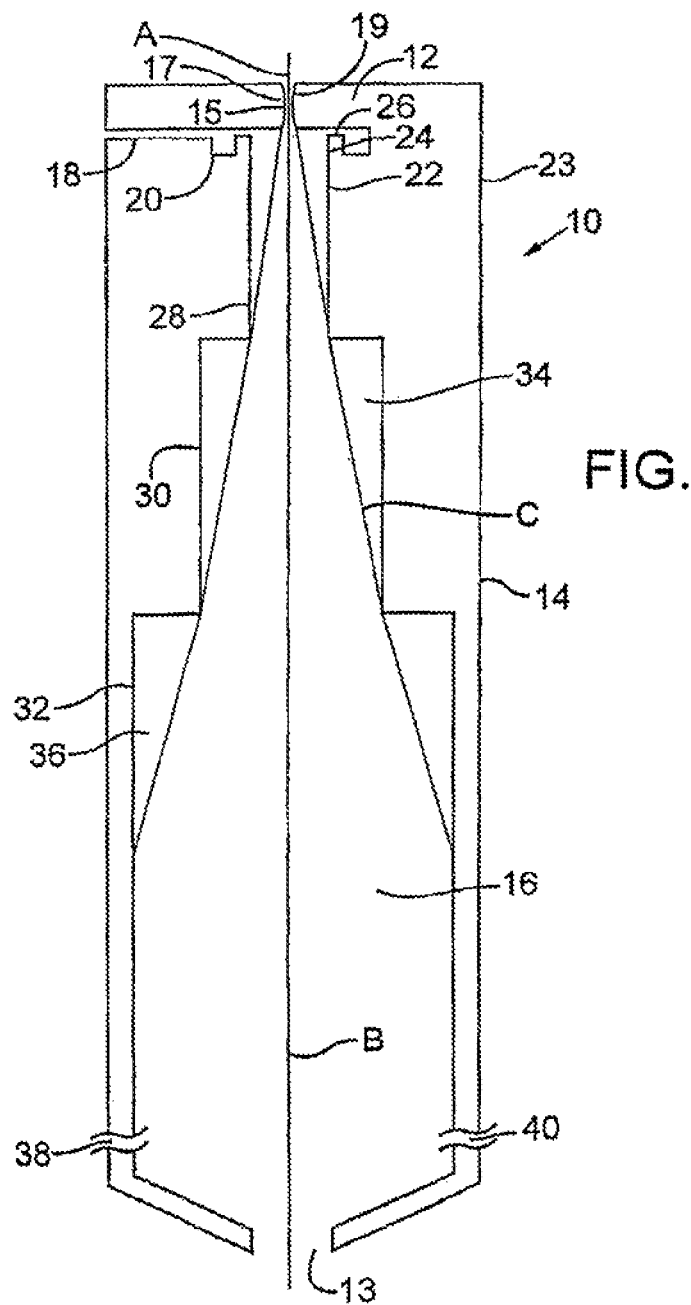
FIG. 1 is a cross-sectional, schematic view of embodiments of a nozzle reactor as described herein.

With reference to FIG. 1, the nozzle reactor, indicated generally at 10, has an injection end 12, a tubular reactor body 14 extending from the injection end 12, and an ejection port 13 in the reactor body 14 opposite its injection end 12. The injection end 12 includes an injection passage 15 extending into the interior reactor chamber 16 of the reactor body 14. The central axis A of the injection passage 15 is coaxial with the central axis B of the reactor chamber. With continuing reference to FIG. 1, the injection passage 15 has a circular diametric cross-section and, as shown in the axially-extending cross-sectional view of FIG. 1, opposing inwardly curved side wall portions 17, 19 (i.e., curved inwardly toward the central axis A of the injection passage 15) extending along the axial length of the injection passage 15. In some embodiments, the axially inwardly curved side wall portions 17, 19 of the injection passage 15 allow for a higher speed of injection gas when passing through the injection passage 15 into the reactor chamber 16.

In some embodiments, the side wall of the injection passage 15 can provide one or more among: (i) uniform axial acceleration of gas passing through the injection nozzle passage; (ii) minimal radial acceleration of such gas; (iii) a smooth finish; (iv) absence of sharp edges; and (v) absence of sudden or sharp changes in direction. The side wall configuration can render the injection passage 15 substantially isentropic. These latter types of side wall and injection passage 15 features can be, among other things, particularly useful for pilot plant nozzle reactors of minimal size.

A material feed passage or channel 18 extends from the exterior of the junction of the injection end 12 and the tubular reactor body 14 toward the reaction chamber 16 transversely to the axis B of the interior reactor chamber 16. The material feed passage 18 penetrates an annular material feed port 20 adjacent the interior reactor chamber wall 22 at the end 24 of the interior reactor chamber 16 abutting the injection end 12. The material feed port 20 includes an annular, radially extending chamber feed slot 26 in material-injecting communication with the interior reactor chamber 16. The material feed port 20 is thus configured to inject feed material: (i) at about a 90° angle to the axis of travel of cracking gas injected from the injection nozzle passage 15; (ii) around the entire circumference of a cracking gas injected through the injection passage 15; and (iii) to impact the entire circumference of the free cracking gas stream virtually immediately upon its emission from the injection passage 15 into the reactor chamber 16.

The annular material feed port 20 may have a U-shaped or C-shaped cross-section among others. In some embodiments, the material feed port may be open to the interior reactor chamber 16, with no arms or barrier in the path of fluid flow from the material feed passage 18 toward the interior reactor chamber 16. The junction of the material feed port 20 and material feed passage 18 can have a radiused cross-section.

In some embodiments, the material feed passage 18, associated feed port 20, and/or injection passage 15 may have differing orientations and configurations, and there can be more than one material feed port and associated structure. Similarly, in some embodiments the injection passage 15 may be located on or in the side 23 of the reactor chamber 16 (and if desired may include an annular cracking gas port) rather than at the injection end 12 of the reactor chamber 16; and the material feed port 20 may be non-annular and located at the injection end 12 of the reactor chamber 16.

In the embodiment of FIG. 1, the interior reactor chamber 16 can be bounded by stepped, telescoping tubular side walls 28, 30, 32 extending along the axial length of the reactor body 14. In some embodiments, the stepped side walls 28, 30, 32 are configured to: (i) allow a free jet of injected motive gas, such as superheated steam, natural gas, carbon dioxide, or other gas, to travel generally along and within the conical jet path C generated by the ejection nozzle passage 15 along the axis B of the reactor chamber 16, while (ii) reducing the size or involvement of back flow areas, e.g., 34, 36, outside the conical or expanding jet path C, thereby forcing increased contact between the high speed gas jet stream within the conical jet path C and feed material, such as heavy hydrocarbons, injected through the feed port 20.

As indicated by the drawing gaps 38, 40 in the embodiment of FIG. 1, the tubular reactor body 14 has an axial length (along axis B) that is much greater than its width. In the FIG. 1 embodiment, exemplary length-to-width ratios are typically in the range of 2 to 4 or more.

Figure 2:
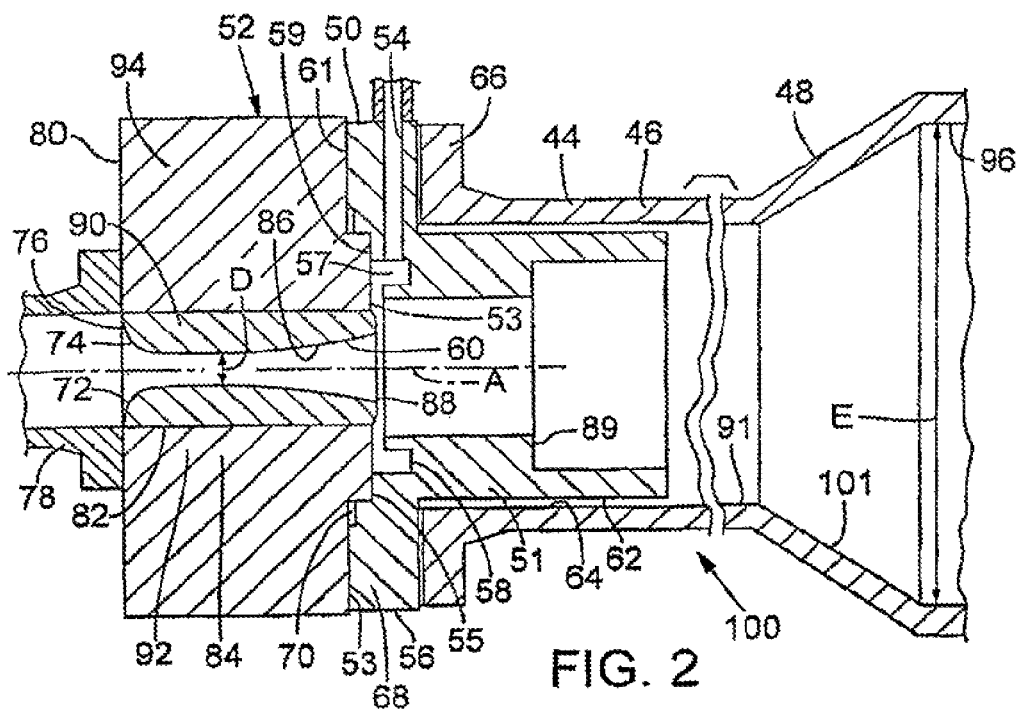
FIG. 2 is a cross-sectional view of the nozzle reactor of FIG. 1, showing further construction details for the nozzle reactor.

With reference now to FIG. 2 and the particular embodiment shown therein, the reactor body 44 includes a generally tubular central section 46 and a frustoconical ejection end 48 extending from the central section 46 opposite an insert end 50 of the central section 46, with the insert end 50 in turn abutting the injection nozzle 52. The insert end 50 of the central section 46 consists of a generally tubular central body 51. The central body 51 has a tubular material feed passage 54 extending from the external periphery 56 of the insert end 50 radially inwardly to injectingly communicate with the annular circumferential feed port depression or channel 58 in the otherwise planar, radially inwardly extending portion 59 of the axially stepped face 61 of the insert end 50. The inwardly extending portion 59 abuts the planar radially internally extending portion 53 of a matingly stepped face 55 of the injection nozzle 52. The feed port channel 58 and axially opposed radially internally extending portion 53 of the injection nozzle 52 cooperatively provide an annular feed port 57 disposed transversely laterally, or radially outwardly, from the axis A of a preferably non-linear injection passage 60 in the injection nozzle 52.

The tubular body 51 of the insert end 50 is secured within and adjacent the interior periphery 64 of the reactor body 44. The mechanism for securing the insert end 50 in this position may consist of an axially-extending nut-and-bolt arrangement (not shown) penetrating co-linearly mating passages (not shown) in: (i) an upper radially extending lip 66 on the reactor body 44; (ii) an abutting, radially outwardly extending thickened neck section 68 on the insert end 50; and (iii) in turn, the abutting injector nozzle 52. Other mechanisms for securing the insert end 50 within the reactor body 44 may include a press fit (not shown) or mating threads (not shown) on the outer periphery 62 of the tubular body 51 and on the inner periphery 64 of the reactor body 44. Seals, e.g., 70, may be mounted as desired between, for example, the radially extending lip 66 and the abutting the neck section 68 and the neck section 68 and the abutting injector nozzle 52.

The non-linear injection passage 60 has, from an axially-extending cross-sectional perspective, mating, radially inwardly curved opposing side wall sections 72, 74 extending along the axial length of the non-linear injection passage 60. The entry end 76 of injection passage 60 provides a rounded circumferential face abutting an injection feed tube 78, which can be bolted (not shown) to the mating planar, radially outwardly extending distal face 80 on the injection nozzle 52.

In the embodiment of FIG. 2, the nozzle passage 60 is a DeLaval type of nozzle and has an axially convergent section 82 abutting an intermediate relatively narrower throat section 84, which in turn abuts an axially divergent section 86. The nozzle passage 60 also has a circular diametric cross-section (i.e., in cross-sectional view perpendicular to the axis of the nozzle passage) all along its axial length. In some embodiments, the nozzle passage 60 may also present a somewhat roundly curved thick 82, less curved thicker 84, and relatively even less curved and more gently sloped relatively thin 86 axially extending cross-sectional configuration from the entry end 76 to the injection end 88 of the injection passage 60 in the injection nozzle 52.

The nozzle passage 60 can thus be configured to present a substantially isentropic or frictionless configuration for the injection nozzle 52. This configuration may vary, however, depending on the application involved in order to yield a substantially isentropic configuration for the application.

The injection passage 60 is formed in a replaceable injection nozzle insert 90 press-fit or threaded into a mating injection nozzle mounting passage 92 extending axially through an injection nozzle body 94 of the injection nozzle 52. The injection nozzle insert 90 is preferably made of hardened steel alloy, and the balance of the nozzle reactor 100 components other than seals, if any, are preferably made of steel or stainless steel.

In the particular embodiment shown in FIG. 2, the narrowest diameter D within the injection passage is 140 mm. The diameter E of the ejection passage opening 96 in the ejection end 48 of the reactor body 44 is 2.2 meters. The axial length of the reactor body 44, from the injection end 88 of the injector passage 60 to the ejection passage opening 96, is 10 meters.

The interior peripheries 89, 91 of the insert end 50 and the tubular central section 46, respectively, cooperatively provide a stepped or telescoped structure expanding radially outwardly from the injection end 88 of the injection or injector passage 60 toward the frustoconical end 48 of the reactor body 44. The particular dimensions of the various components, however, will vary based on the particular application for the nozzle reactor, generally 100. Factors taken into account in determining the particular dimensions include the physical properties of the cracking gas (density, enthalpy, entropy, heat capacity, etc.) and the pressure ratio from the entry end 76 to the injection end 88 of the injector passage 60.

The embodiment of FIG. 2 may be used to, for example, crack heavy hydrocarbon material, including bitumen if desired, into lighter hydrocarbons and other components. In order to do so in some embodiments, superheated steam (not shown) is injected into the injection passage 60. The pressure differential from the entry end 76, where the pressure is relatively high, to the ejection end 88, where the pressure is relatively lower, aids in accelerating the superheated steam through the injection passage 60.

In some embodiments having one or more non-linear cracking gas injection passages, e.g., 60, such as the convergent/divergent configuration of FIG. 2, the pressure differential can yield a steady increase in the kinetic energy of the cracking gas as it moves along the axial length of the cracking gas injection passage(s) 60. The cracking gas may thereby eject from the ejection end 88 of the injection passage 60 into the interior of the reactor body 44 at supersonic speed with a commensurately relatively high level of kinetic energy. In these embodiments, the level of kinetic energy of the supersonic discharge cracking gas is therefore greater than can be achieved by certain prior art straight-through injectors or other injectors such as the convergent, divergent, convergent nozzle reactor of the '615 Publication.

Other embodiments of a cracking gas injection passage may not be as isentropic but may provide a substantial increase in the speed and kinetic energy of the cracking gas as it moves through the injection passage 60. For example, an injection passage 60 may comprise a series of conical or toroidal sections (not shown) to provide varying cracking gas acceleration through the passage 60 and, in some embodiments, supersonic discharge of the cracking gas from the passage 60.

In some methods of use of the nozzle reactor embodiment illustrated in FIG. 2, heavy hydrocarbon feed stock (not shown) is pre-heated, for example at 2-15 bar, which is generally the same pressure as that in the reactor body 44. In the case of bitumen feed stock, the preheat should provide a feed stock temperature of 300 to 500°, and most advantageously 400 to 450° C. Contemporaneously, the preheated feed stock is injected into the material feed passage 54 and then through the mating annular feed port 57. The feed stock thereby travels radially inwardly to impact a transversely (i.e., axially) traveling high speed cracking gas jet (for example, steam, natural gas, carbon dioxide or other gas not shown) virtually immediately upon its ejection from the ejection end 88 of the injection passage 60. The collision of the radially injected feed stock with the axially traveling high speed steam jet delivers kinetic and thermal energy to the feed stock. The applicants believe that this process may continue, but with diminished intensity and productivity, through the length of the reactor body 44 as injected feed stock is forced along the axis of the reactor body 44 and yet constrained from avoiding contact with the jet stream by the telescoping interior walls, e.g., 89, 91 101, of the reactor body 44. Depending on the nature of the feed stock and its pre-feed treatment, differing results can be procured, such as cracking of heavy hydrocarbons, including bitumen, into lighter hydrocarbons and, if present in the heavy hydrocarbons or injected gas, other materials.

Figure 3:
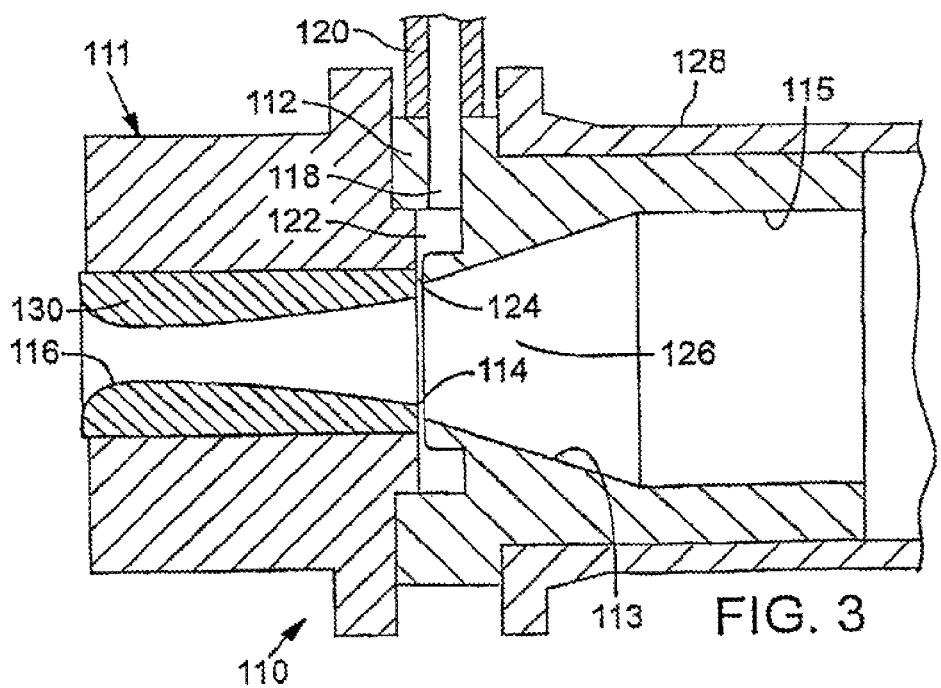
FIG. 3 is a cross-sectional view of embodiments of a nozzle reactor as described herein.

With reference now to FIG. 3, an alternative embodiment of the nozzle reactor, generally 110, has a nozzle 111 and a reactor body 128 with an insert end 112 intermediate the reactor body 128 injector insert 130. The insert end 112 has a conical interior periphery section 113 that: (i) extends, and expands outwardly, from the injection end 114 of the injection passage 116 of the nozzle 111; and (ii) terminates with a maximum diameter at the abutting tubular interior periphery section 115 of the insert end 112 opposite the ejection end 114 of the injection passage 116. This alternative embodiment also has a feed material injection passage 118 formed of a material feed line or tube 120 in communication with an annular material feed distribution channel 122, which in turn is in communication with an axially narrower annular material feed injection ring or port 124. The material feed injection ring 124 is laterally adjacent the ejection end 114 of the injection passage 116 to radially inwardly inject material feed stock, such as bitumen or other hydrocarbons (not shown) for example, into contact with axially injected cracking gas (not shown) virtually immediately upon the ejection of the cracking gas from the ejection end 114 into the interior 126 of the reactor body 128.

The injection passage 116 can be configured to eject a free stream of cracking gas, such as super-heated steam (not shown) for example, generally conically with an included angle of about 18°. The conical interior section 113 may be configured to surround or interfere with such a free stream of cracking gas ejection stream. In certain such embodiments, after engaging the injected material feed stock adjacent the ejection end 114, the resulting jet mixture—a mixture of cracking gas and material feed stock—preferably makes at least intermittent interrupting contact with the tubular interior section 113 and, if desired, the downstream tubular interior section 115. This intermittent, interrupting contact increases turbulence and concentrates shear stresses into an axially shortened reaction zone within the reactor body 128. Preferably, however, the jet mixture travels through the interior 126 of the reactor body 128 with minimal backflow of any components of the jet mixture, resulting in more rapid plug flow of all jet mixture components through the reactor body 128.

Once the material feed stock is cracked by the cracking gas ejection stream adjacent the injection end 114, the configuration of the reactor body facilitates substantially immediate cooling of the jet mixture. This cooling of the jet mixture acts to arrest the chemical reaction between the material feed stock and the cracking gas ejection stream.

The applicants believe that, in some embodiments, sufficient steam cracking of at least certain heavy hydrocarbons may be achieved at jet velocities above about 300 meters per second while the retention time in the reactor body zone providing such extreme shear can be very short, on the order of only about 0.01 second. In such embodiments, cracking of material feed stock, such as bitumen for example, can be caused by extreme shear of the cracking gas. In certain of these types of embodiments, the retention time of the material feed or cracking gas in the reactor body 128 therefore can have little or no impact on such cracking or, if desired, any other substantial cracking.

In some embodiments, a catalyst can be introduced into the nozzle reactor to enhance cracking of the material feed stock by the cracking gas ejection stream.

In the applicant's view, the methodology of nozzles of the type shown in the illustrated embodiments, to inject a cracking gas such as steam, can be based on the following equation $$KE_1 = H_1 - H_0 + KE_0 \quad (1)$$

where $KE_1$ is the kinetic energy of the cracking material (referred to as the free jet) immediately upon emission from an injection nozzle, $H_0$ is the enthalpy of cracking material upon entry into the injection nozzle, $H_1$ is the enthalpy of cracking material upon emission from the injection nozzle, and $KE_0$ is the kinetic energy of the cracking material at the inlet of the nozzle.

This equation derives from the first law of thermodynamics—that regarding the conservation of energy—in which the types of energy to be considered include: potential energy, kinetic energy, chemical energy, thermal energy, and work energy. In the case of the use of the nozzles of the illustrated embodiments to inject steam, the only significantly pertinent types of energy are kinetic energy and thermal energy. The others—potential, chemical, and work energy—can be zero or low enough to be disregarded. Also $KE_0$, the inlet kinetic energy, can be low enough to be disregarded. Thus, the resulting kinetic energy of the cracking material is as set forth in the above equation is simplified to the change in enthalpy $\Delta H$.

The second law of thermodynamics—an expression of the universal law of increasing entropy, stating that the entropy of an isolated system which is not in equilibrium will tend to increase over time, approaching a maximum value at equilibrium—means that no real process is perfectly isentropic. However, a practically isentropic nozzle (i.e., a nozzle commonly referred to as "isentropic" in the art) is one in which the increase in entropy through the nozzle results in a relatively complete or very high conversion of thermal energy into kinetic energy. On the other hand, non-isentropic nozzles such as a straight-bore nozzle not only result in much less efficiency in conversion of thermal energy into kinetic energy but also can impose upper limits on the amount of kinetic energy available from them.

For example, since the velocity of an ideal gas through a nozzle is represented by the equation $$V = (-2\Delta H)^{1/2} \quad (2)$$

and the velocity in a straight-bore nozzle is limited to the speed of sound, the kinetic energy of a gas jet delivered by a straight-bore nozzle is limited. However, a practically "isentropic" converging/diverging nozzle, such as shown in FIGS. 1-7, can yield, i.e., eject, a gas jet that is supersonic. Consequently, the kinetic energy of the gas jet delivered by such an isentropic converging/diverging nozzle can be substantially greater than that of the straight-bore nozzle.

It can thus be seen that some embodiments disclosed above can provide a nozzle reactor providing enhanced transfer of kinetic energy to the material feed stock through many aspects such as, for example, by providing a supersonic cracking gas jet, improved orientation of the direction of flow of a cracking gas (or cracking gas mixture) with respect to that of the feed stock, and/or more complete cracking gas stream impact with the material feed stock as a result of, for example, an annular material feed port and the telescoped reactor body interior. Some embodiments also can result in reduced retention of by-products, such as coking, on the side walls of the reactor chamber. Embodiments of the nozzle reactor can also be relatively rapid in operation, efficient, reliable, easy to maintain and repair, and relatively economical to make and use.

It should be noted that, in some embodiments including in conjunction with the embodiments shown in FIGS. 1-3 above, the injection material may comprise a cracking fluid or other motive material rather than, or in addition to, a cracking gas. Accordingly, it is to be understood that some embodiments may utilize components that comprise motive material compatible components rather than, as described in particular embodiments above, cracking gas compatible components such as, for example, the cracking gas injection passage, e.g., 60, referenced above. When utilized in conjunction with an inwardly narrowed motive material injection passage, however, the motive material preferably is compressible.

Figure 4:
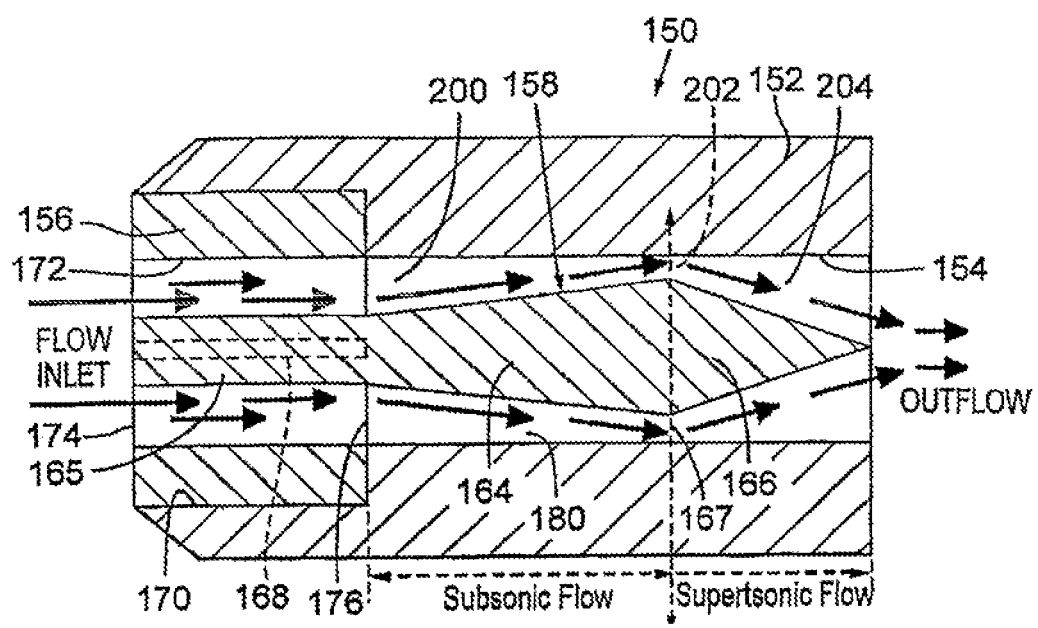
FIG. 4 is a cross-sectional, schematic view of embodiments of an injection nozzle for use with a nozzle reactor.

The applicants believe that a non-linear nozzle reactor embodiment (as generally shown in FIG. 1) and a linear injector nozzle reactor one inch in axial length (configured as generally shown in FIG. 4) provide the following theoretical results for 30 bar steam feed stock supplied at 660° C. with interior reactor body pressures of 10 bar and 3 bar as shown. For both of these types of nozzles, however, the nozzle configurations must be changed (by varying the position of the throat 84 and the diameter of the discharge or injection end 88) in order to deliver 2 barrels per day (water volume) of steam at 10 bars and 3 bars. The results listed in Table 1 are based on the assumption of perfect gas behavior and the use of k ($C_p/C_v$, ratio of specific heats).

TABLE 1

| | Straight-Through Injector Nozzle reactor | | Convergent/Divergent Injection | |
|---|---|---|---|---|
| | 10 bar | 3 bar | 10 bar | 3 bar |
| Throat Diameter, mm | 1.60 | 2.80 | 1.20 | 1.20 |
| Steam Temp., ° C. | 560.0 | 544.3 | 464.4 | 296.7 |
| Steam Velocity, m/s | 647.1 | 690.0 | 914.1 | 1244.1 |
| Mach Number | 0.93 | 1.00 | 1.39 | 2.12 |
| Kinetic energy, kW | 0.72 | 1.12 | 1.43 | 2.64 |

As can be seen from the results of applicants' calculations above, the theoretically tested straight-through injection nozzles of the prior art theoretically provide steam jet velocity at, or less than, the speed of sound. In contrast, the theoretically tested convergent/divergent injection nozzles of the present application theoretically can provide a steam jet velocity in the reactor body well in excess of the speed of sound and, at 3 bar interior reactor body pressure, in excess of twice the speed of sound. Similarly and as a result, the associated kinetic energies of steam jets of the convergent/divergent injection nozzles are theoretically significantly greater than the associated kinetic energies of the steam jets of the linear injection nozzles.

The applicants therefore believe that the theoretically tested convergent/divergent injection nozzles of the present application, such as nozzle 111 of FIG. 3, are significantly closer to isentropic than the theoretically tested straight-through nozzle. As shown by the theoretical kinetic energy data above, the applicants also believe that the theoretically tested convergent/divergent injection nozzles can be 2 to 2.5 times more efficient than the theoretically tested straight-through nozzles identified above. The above theoretical results were obtained using steam as the cracking gas and therefore, are based on thermodynamic properties of steam.

However, similar theoretical results can be obtained using other gaseous motive fluids as the cracking gas.

Figure 5:
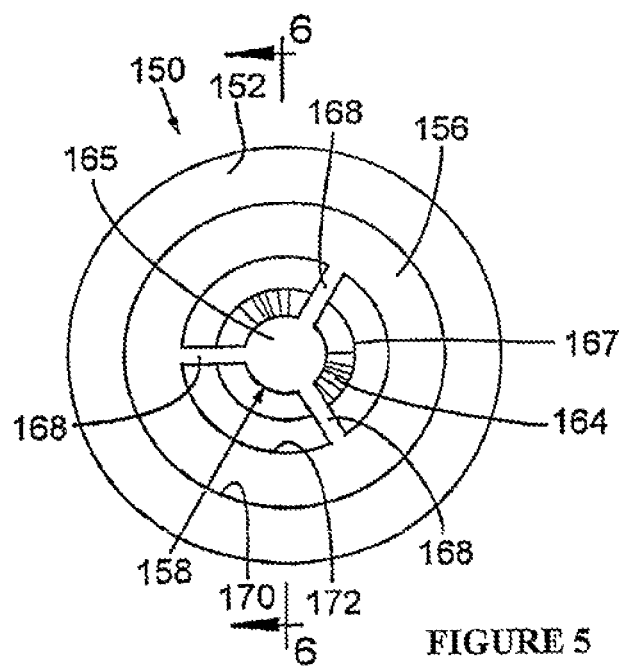
FIG. 5 is an end view of the injection nozzle of FIG. 4 taken from the inlet end of the nozzle.

In some embodiments, a nozzle reactor of the present application can include an injection nozzle that has a flow directing insert around which a first material can flow to increase the velocity of the first material in preparation for an interaction with a second material to alter the mechanical or chemical composition of the first and/or second materials. For example, as shown in FIGS. 4 and 5, an injection nozzle 150 includes an injection nozzle body 152 having an injection passage 154 extending axially through the body. In certain implementations, the passage 154 has a constant diameter along the axial length of the passage. In other implementations, the diameter of the passage 154 varies, such as decreasing along the axial length of the passage, i.e., narrowing of the passage, or increasing along the axial length of the passage, i.e., widening of the passage, or various combinations of both. A flow directing insert 166 is positioned within the injection passage 154, but remains out of direct contact with the inner surface of the injection passage through use of a supporting insert 156. The flow directing insert 166 can be coupled to the supporting insert 156, which is inserted and secured within a mating supporting insert recess 170 formed in the injection nozzle body 152.

The supporting insert 156 can include one or more support rods 168 connected to a cylindrical portion 165 of the flow directing insert 166. The cylindrical portion 165 includes outer peripheral surfaces that run parallel to the axis of the insert 156. The supporting insert 156 comprises a generally annular shaped fluid flow passage 172 corresponding to the injection passage 154 of the injection nozzle body 152 such that when inserted in the recess 170, the interior periphery of the passage 172 is generally flush with the interior periphery of passage 154. Cross-sectional areas of the fluid flow passage 172 on planes perpendicular to the axis of the fluid flow passage 172 remain substantially the same extending the axial length of the passage 172. In other words, an outer diameter and inner diameter of the fluid flow passage 172 remain generally unchanged throughout the passage.

In some implementations, the inserts 156, 158 are replaceable. In specific implementations, the insert 156, with insert 158 secured thereto, can include external threads and can be removably secured within the mating supporting insert recess 170 by threadably engaging internal threads formed in the recess. In other specific implementations, the insert 158 is press-fit into the recess 170. Yet in other implementations, the insert 156 is bonded to the recess 170 by applying a bonding material, such as a heat-activated adhesive, pressure-activated adhesive, pressure-activated adhesive, or other similar adhesive, between the outer periphery of the insert and the recess, and activating the bonding material.

Fluid, such as cracking gas, is allowed to flow through the nozzle 150 by first 30 passing through a flow inlet opening 174 in the supporting insert 156, the fluid flow passage 172 and a flow outlet opening 176 in the supporting insert. As shown in FIG. 4, the fluid flows around the cylindrical portion 165 and the support rods 168 as it flows through the fluid flow passage 172 at a generally constant velocity. Preferably, the number and cross-sectional area of the support rods 168 are minimized so as not to substantially disrupt the flow of fluid through the fluid flow passage 172.

When the flow directing insert is positioned within the injection passage 154, a generally annular fluid flow passage 180, defined between the surface of the injection passage and the exterior surface of the flow directing insert 158, is formed.

The flow directing insert 158 comprises a diverging, or expanding, portion 164, a converging, or contracting, portion 166 and a transitioning portion 167 coupling the diverging and converging portions. In the illustrated embodiments, the diverging and converging portions 164, 166 are generally frustoconically shaped and conically shaped, respectively, with abutting base surfaces proximate the transitioning portion 167. The diameter of the diverging portion increases and the diameter of the converging portion decreases along the axial length of the flow directing insert 158 in the fluid flow direction as indicated in FIG. 4. Accordingly, the annular fluid flow passage 180 between the diverging portion 164 of the flow directing insert 158 and the outer periphery of the injection passage 154, i.e., converging region 200, narrows in the fluid flow direction and the annular fluid flow passage between the converging portion 166 of the flow direction insert and the outer periphery of the injection passage, i.e., diverging region 204, widens in the fluid flow direction. As can be recognized, the annular fluid flow passage 180 is most narrow between the transition portion 167 of the insert 158 and the outer periphery of the injection passage 154, i.e., transition, or throat, region 202.

Fluid flowing through the fluid flow passage 172 in the supporting insert 156 exits through the outlet opening 176 of the passage 172 and into the annular fluid flow passage 180. The nozzle can be configured such that fluid flowing through the fluid flow passage 172 and into the annular fluid flow passage 180 flows at a velocity less than the speed of sound, i.e., subsonic flow. As the fluid flows through the fluid flow passage 180, the narrowing of the converging region and the widening of the diverging region help to induce a back pressure, i.e., pressure is higher at the entry of the passage 180 than at the exit of the passage, which increases the velocity of the fluid. The fluid velocity can be increased such that as the fluid exits the transition region its velocity is at or above the speed of sound, i.e., supersonic flow. The fluid remains at supersonic flow through the diverging region and as it exits the nozzle 150 at the end of the diverging region.

Like the nozzle end 12 of FIG. 1, the injection nozzle 52 of FIG. 2 and the reactor body injection insert 130 of FIG. 3, the nozzle 150 can be coupled to a reactor chamber. Further, the fluid flowing through the nozzle can be a cracking gas that, upon exiting from the nozzle, immediately contacts radially inwardly injected material feed stock proximate the nozzle exit to induce interaction between the cracking gas and the material feed.

Figure 6:
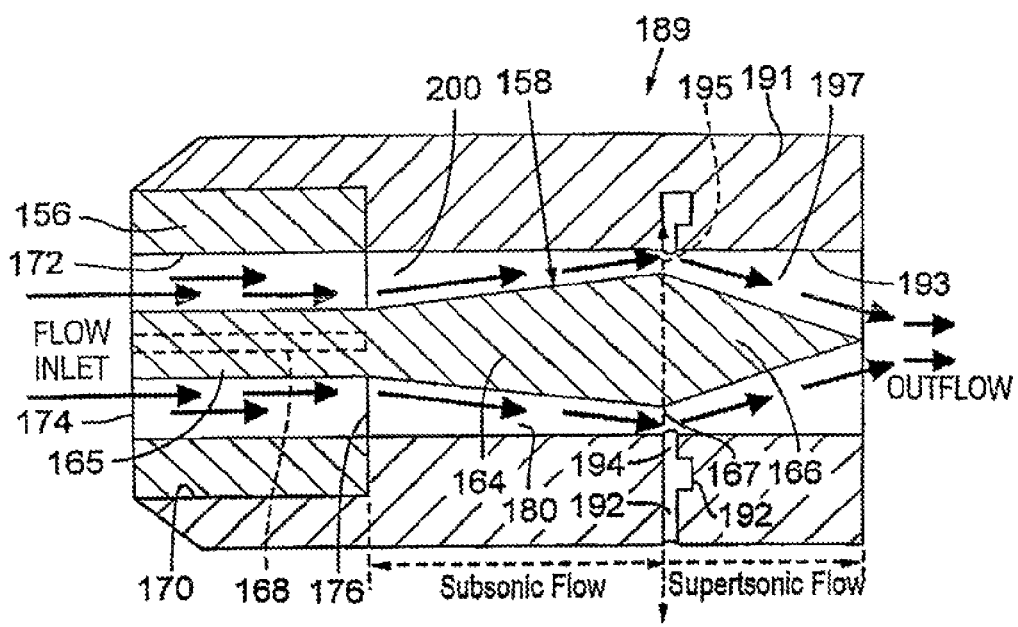
FIG. 6 is a cross-sectional, schematic view of embodiments of an injection nozzle for use with a nozzle reactor, with the nozzle having a material feed injection passage formed in the nozzle body.

Alternatively, as shown in FIG. 6, a feed material injection passage 190 that extends from an exterior of injection nozzle body 191 toward the injection passage 193. The material feed injection passage 190 penetrates an annular material feed port 192 adjacent the outer periphery of the injection passage 193 proximate transition region 195. The annular material feed port 192 includes an annular, radially extending chamber feed slot 194 in material-injecting communication with an exit of the transition region 195. Similar to FIG. 1, the feed port 192 is configured to inject feed material: (i) at about a 90° angle to the axis of travel of cracking gas flowing through the transition region 195; (ii) around the entire circumference of cracking gas flowing out of the transition region; and (iii) to impact the entire circumference of the free cracking gas virtually immediately upon its emission from the transition region into diverging region 197.

Figure 7:
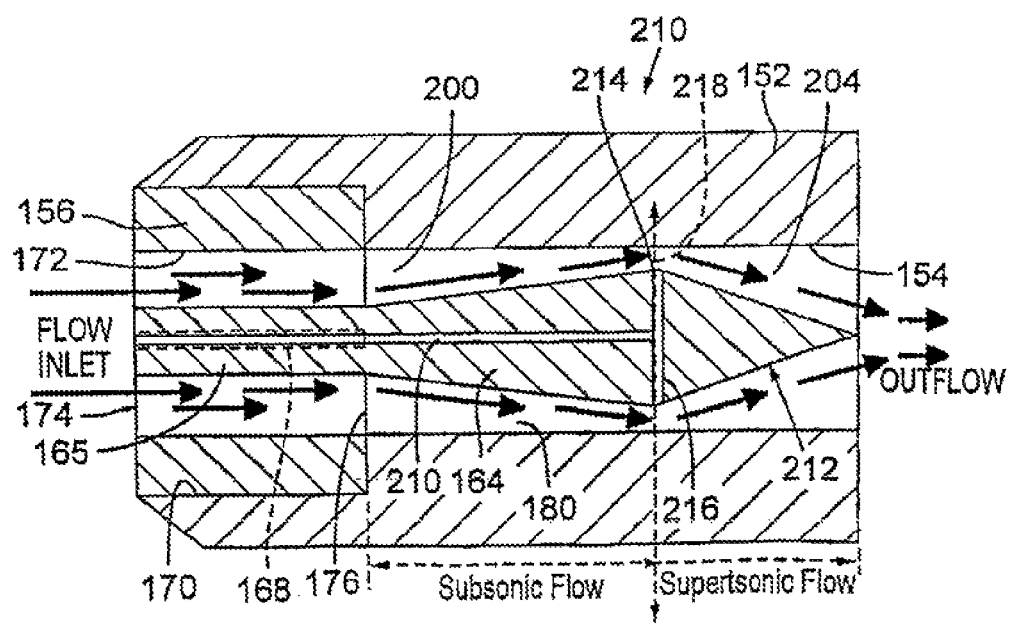
FIG. 7 is a cross-sectional, schematic view of embodiments of an injection nozzle for use with a nozzle reactor, with the nozzle having a material feed injection passage formed in the flow directing insert.
Figure 8:
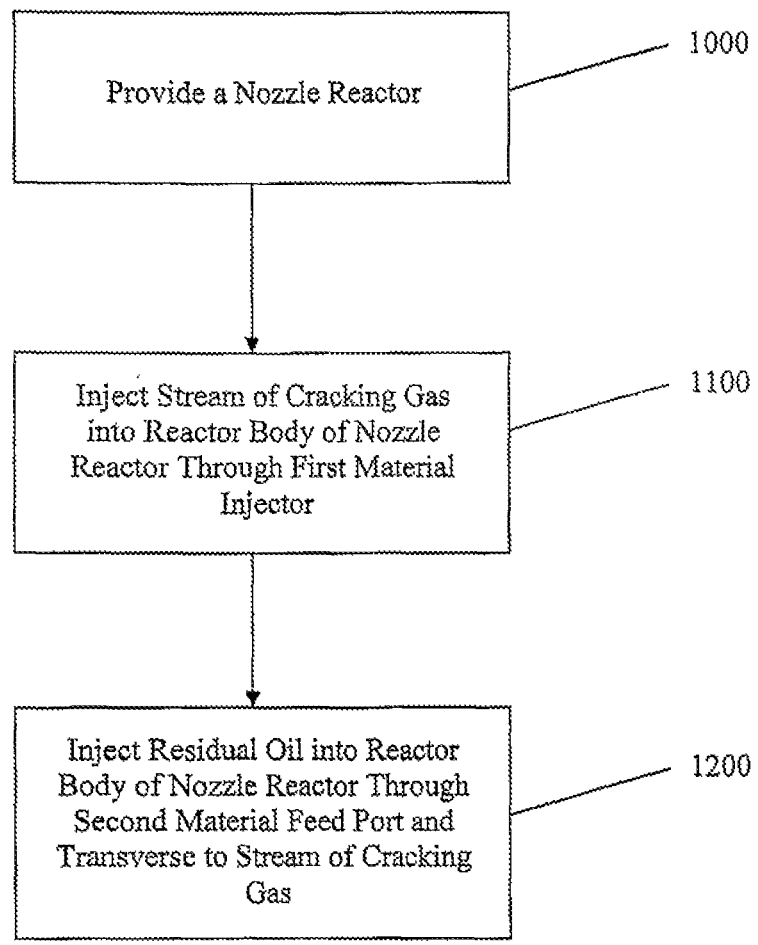
FIG. 8 is a flow diagram illustrating a method of cracking residual oil according embodiments disclosed herein.

Now referring to FIG. 7, nozzle 210 is similar to the nozzle 150 of FIGS. 6 and 7 and nozzle 189 of FIG. 8, except that feed material injection passage 210 is formed in the flow directing insert 212 and axially extends from an end of the flow directing insert toward a transitioning portion 214 of the insert. The injection passage 210 penetrates a disk-shaped feed slot 216 in material-injecting communication with an exit of a transition region 218. Feed material can be injected through the passage 210 through the feed slot 216 and around the entire circumference of cracking gas flowing out of the transition region 218 at a 90° angle to the axis of travel of fluid, e.g., cracking gas, flowing through the transition region. The feed material then impacts the entire circumference of the fluid as described above.

Some embodiments of the present reactor nozzle and method of use can therefore accomplish cracking of bitumen and other feed stocks primarily, or at least more substantially, by mechanical shear at a molecular level rather than by temperature, retention time, or involvement of catalysts. Although such cracking of the hydrocarbon molecules yields smaller, charge imbalanced hydrocarbon chains which subsequently satisfy their charge imbalance by chemical interaction with other materials in the mixed jet stream or otherwise, the driving force of the hydrocarbon cracking process can be mechanical rather than chemical. In addition, some embodiments can utilize the greater susceptibility of at least certain heavy hydrocarbons to mechanical cracking in order to selectively crack particular hydrocarbons (such as relatively heavy bitumen for example) as opposed to other lighter hydrocarbons or other materials that may be in the feed stock material as it passes through the nozzle reactor.

Also, in some embodiments, the configuration of the nozzle reactor can reduce and even virtually eliminate back mixing while enhancing, for example, plug flow of the cracking gas and material feed mixture through the reactor body and cooling of the mixture through the reactor body. This can aid in not only enhancing mechanical cracking of the material feed but also in reducing coke formation and wall scaling within the reactor body. In combination with injection of a high velocity cracking gas or other motive material from the injection nozzle into the reactor body, coke formation and wall scaling can be even more significantly reduced if not virtually or practically eliminated. In these embodiments, the nozzle reactor can thus provide more efficient and complete cracking, and if desired selective cracking, of heavy hydrocarbons, while reducing and in some embodiments virtually eliminating wall scaling within the reactor body.

In some embodiments, a method of cracking residual oil is disclosed. With reference to FIG. 8, the method may generally include providing a nozzle reactor 1000, injecting a stream of cracking material into the reactor body of the nozzle reactor 1100, and injecting residual oil into the reactor body of the nozzle reactor in a direction transverse to the stream of cracking material 1200. As discussed in greater detail above, the cracking material fed into the reactor body of the nozzle reactor may be accelerated to a supersonic speed and contacted with the residual oil at a perpendicular angle, thereby cracking the residual oil into lighter hydrocarbon molecules.

The nozzle reactor may generally include a nozzle reactor according to any embodiment or aspect described herein. In some embodiments, the nozzle reactor may include a reactor body, a first material injector, and a second material feed port. The reactor body may include a reactor body passage with an injection end and an ejection end. The first material injector may include a first material injection passage and may be mounted in the nozzle reactor in material injecting communication with the injection end of the reactor body. Furthermore, the first material injection passage may have an enlarged volume injection section, an enlarged volume ejection section, and a reduced volume mid-section intermediate the enlarged volume injection section and enlarged volume ejection section. The first material injection passage may also have a material injection end and a material ejection end in injecting communication with the reactor body passage. The second material feed port may penetrate the reactor body. The location of the second material feed port may be adjacent to the material ejection end of the first material injection passage and transverse to a first material injection passage axis extending from the material injection end and material ejection end in the first material injection passage in the first material injector. Other features of the nozzle reactor are described in greater detail above.

The dimensions of the various components of the nozzle reactor are not limited, and may generally be adjusted based on the amount of hydrocarbon (e.g., residual oil) to be cracked inside the nozzle reactor. Table 2 provides exemplary dimensions for the various components of the nozzle reactor based on the hydrocarbon input in barrels per day (BPD).

TABLE 2

| Nozzle Reactor Component (mm) | Hydrocarbon Input (BPD) | | |
|---|---|---|---|
| | 5,000 | 10,000 | 20,000 |
| First Material Injector, Enlarged Volume Injection Section Diameter | 148 | 207 | 295 |
| First Material Injector, Reduced Volume Mid-Section Diameter | 50 | 70 | 101 |
| First Material Injector, Enlarged Volume Ejection Section Diameter | 105 | 147 | 210 |
| First Material Injector Length | 600 | 840 | 1,200 |
| Reactor Body Passage Injection End Diameter | 187 | 262 | 375 |
| Reactor Body Passage Ejection End Diameter | 1,231 | 1,435 | 1,821 |
| Reactor Body Length | 6,400 | 7,160 | 8,800 |
| Overall Nozzle Reactor Length | 7,000 | 8,000 | 10,000 |
| Overall Nozzle Reactor Outside Diameter | 1,300 | 1,600 | 2,000 |

As can be seen from Table 2, the first material injector may be small relative to the reactor body. The size of the first material injector is beneficial in that the first material injector may be a replaceable insert that is easily removed from the reactor body. As such, other first material injectors having different internal dimensions and providing different types of injection flow properties for the cracking gas may be used to increase the versatility of the nozzle reactor as a whole. To the contrary, conventional units used for processing residual oil are large and cumbersome apparatus that do not provide versatility.

In some embodiments, the stream of cracking material may be injected into the reactor body via the first material injector and the residual oil may be injected into the reactor body via the second material feed port. In some embodiments, the residual oil may be injected into the reactor body via the first material injector and the cracking material may be injected into the reactor body via the second material feed port.

The residual oil cracked in the method of this embodiment may be any refinery residue produced during any part of a refinement process. Refinery residue may be defined as the remainder of any stream of material fed to a unit of a refinement process after removal of a part or parts of the stream of material or as a part of any stream of material removed from the stream of material after having been fed to a unit of refinement process. The residual oil may be a mixture of various refinery residues. The residual oil may also be a refinery residue mixed with other waste materials, such as slop oil. In some embodiments, the residual oil includes hydrocarbon material remaining after separation is performed on a hydrocarbon source or hydrocarbon material removed from a hydrocarbon source. The hydrocarbon residual oil may have an average molecular weight greater than about 300 Daltons. The hydrocarbon source from which residual oil is separated is not limited and may be any hydrocarbon source that requires refinery processing to produce useful lighter hydrocarbon material. Examples of hydrocarbon sources include, but are not limited to, heavy oil, bitumen, crude oil, and kerogen from oil shale processing.

In some embodiments, the residual oil includes distillation bottoms. Distillation bottoms may be the remaining portion or portions of a material fed to a distillation unit that has not separated from the feedstock via evaporation. In a typical distillation unit, the distillates are the components that are evaporated and then condensed as a means of separating each component from the feed. The varying boiling points of each of the components allow for their separation from the feed and from each other. The heaviest component (or components) of the material being distilled does not undergo evaporation, but rather is separated from the feed by virtue of being the only remaining component (or components) after all other lighter components have been evaporated out of the feed. As such, the heaviest component (or components) of the distilled material may be considered distillation bottoms. The distillation bottoms may be bottoms from any type of distillation unit, including an atmospheric distillation unit and a vacuum distillation unit. The residual oil may also be a combination of different bottoms, such as a combination of atmospheric bottoms and vacuum bottoms.

In some embodiments, the residual oil may include the asphaltenes and asphalt residue that are obtained from a deasphalting process. Deasphalting processes may include processes for precipitating asphaltenes and solvent deasphalting processes, such as a residual oil supercritical extraction (or ROSE™) process. Where the residual oil is asphaltenes and asphalt residue, the material may require some form of pretreatment and/or conditioning prior to being injected into the nozzle reactor.

In some embodiments, the pretreatment or conditioning of asphaltenes includes mixing the asphaltenes with a solvent in order to form a liquid composition that may be injected into the nozzle reactor. The asphaltene can be mixed with any solvent capable of dissolving the asphaltenes and keeping them in solution until the mixture is fed into the nozzle reactor. In some embodiments, the solvent can be an aromatic solvent, such as toluene, Aromatic 100, Aromatic 150, or vacuum gas oil (VGO). Mixing the asphaltene and solvent can be accomplished by any suitable method, including through the use of a powered mixing unit. The amount of solvent added to the asphaltene is also not limited. In some embodiments, the asphaltene:solvent ratio is from about 1:2 to about 2:1.

In some embodiments, the asphaltene and solvent mixture is preheated prior to injection into the nozzle reactor. In some embodiments, the mixture of solvent and asphaltene is preheated to an incipient cracking temperature of from about 350° C. to about 450° C. prior to entering the nozzle reactor.

Where the asphaltene is pretreated with a solvent as described above, the cracked product can undergo a separation process to separate the various components of the cracked product, including removing any remaining solvent from the cracked product. Additionally, distillates from the cracked products can be separated and recycled back into the system and used as solvent. The separation process can be any suitable process, such as a heating step that causes the solvent to evaporate from the cracked products.

The residual oil can also include bottoms from a hydrocracking operation or a coking operation. Residue from a coker is typically referred to as coke, and the coke is typically difficult to dispose. One possible use of the inert coke has been to utilize the coke in high cost gasifiers for the production of CO and $H_2$ as feed to an expensive Fischer-Tropsch plant. However, when utilizing a nozzle reactor as disclosed herein, the coke from a coker may be fed into the nozzle reactor for upgrading of the high molecular weight coke. The coke may require some form of pretreatment and/or conditioning.

In some embodiments, the pretreatment or conditioning of coke includes fine grinding the coke and mixing it with in an organic solvent. The coke may be ground into pieces having a size less than 250 microns. Such grinding can be accomplished by any grinding method known to those or ordinary skill in the art. In one example, the grinding may be performed by hand. In another example, the coke may be ground in an industrial grinding mill. The ground coke can then be mixed with an organic solvent. In some embodiments, the organic solvent can be selected from Aromatic 100, Aromatic 150, and VGO. The ground coke may be mixed with the organic solvent while being ground into smaller particles or after the coke has been ground into smaller particles. Where solvent is added to the coke after grinding, the pretreatment process may also include a mixing or agitation step to form a solvent/coke slurry. Any method for mixing the materials may be used, including manual mixing and powered mixing. The organic solvent may be added to the ground up coke in any suitable amount for creating a mixture of the two materials. In some embodiments, solvent is added to ground coke at a weight ratio of from 2:1 to 1:1.

In some embodiments, the finely ground coke can be mixed with a gaseous carrier material prior to being injected into the nozzle reactor. Any carrier gas suitable for transporting the coke into the nozzle reactor can be used. In some embodiments, the carrier gas is natural gas, nitrogen, or refinery fuel gas. The mechanism of transporting the mixture of ground coke and carrier gas towards and into the nozzle reactor can generally be via dense phase pneumatic conveying. Any suitable ratio of coke to carrier gas can be used. In some embodiments, the ratio of coke to carrier gas ranges from 30:1 to 50:1 on a weight basis.

In some embodiments, the mixture of ground coke and solvent can be preheated prior to injection into the nozzle reactor. The mixture of ground coke and solvent can be heated to a temperature below the solvent boiling point in order to avoid coking of pipes and furnaces.

Where the coke is pretreated with solvent as described above, the cracked product can undergo a separation process to separate the various components of the cracked product, including removing any remaining organic solvent from the cracked product. The separation process can include any suitable process, including any process for removing the product distillates from coke conversion. The unreacted coke material and the VGO can be recycled back to the initial stages of the process and blended with additional fresh mixtures of solvent and ground coke.

In some embodiments, the residual oil may include the stripped remainder of a vacuum stripping unit. Vacuum stripping units are stripper units operated at reduced pressure to facilitate the transfer of less volatile components into the stripping gas. Vacuum stripping units may generally include a feed inlet at the top of the unit where feed material is dispersed over a packed column. The vacuum stripping unit may also include a stripping gas inlet at the bottom of the unit. In operation, the stripping gas rises through the packed column as the feed material trickles down through the packed column. The packed column increases the surface area of the feed material. In operation, volatile components of the feed material transfer into the stripping gas as it rises up and past the feed material. The reduction of pressure inside the packed column facilitates the transfer of less volatile components (i.e., components that would not transfer into the stripping gas at atmospheric conditions). Thus, stripping gas leaving the top of the unit includes volatile components stripped from the feed material. Conversely, the feed material leaving the bottom of the unit is stripped of the volatile components and includes only the least volatile components of the feed material. Where the feed material is a hydrocarbon source such as bitumen, the lighter hydrocarbon fractions of the feed material will be stripped away from the feed material in the stripping gas, while the heavy hydrocarbons will remain in the stripped material that trickles to the bottom of the packed column. This material may be collected at the bottom of the packed column as residual oil and injected into the nozzle reactor.

As can be understood from the above description, residual oil can include hydrocarbon material where the lighter fractions of a hydrocarbon source are not part of the residual oil. Removing the light hydrocarbon fractions of a hydrocarbon material prior to injection of the hydrocarbon material into the nozzle reactor (such as in the case of vacuum stripping as described above) may provide several benefits. Firstly, steam utilization in the nozzle reactor may be reduced. The lighter fractions of the hydrocarbon material will typically be in a gaseous state when entering the nozzle reactor, which tends to dilute the steam after it is injected into the nozzle reactor. Additional superheated steam is typically required to make up for this dilution. By reducing or eliminating the gaseous light hydrocarbon fractions, less steam consumption can occur, in some embodiments, because the steam is more concentrated inside the nozzle reactor. The conversion rate of the hydrocarbon material injected into the nozzle reactor may also be improved by the absence of the lighter hydrocarbon material, which tends to only interfere with the cracking of the heavier hydrocarbon material. Finally, a more compact system may be used.

The nozzle reactor may generally operate on the principle that the fractions of the residual oil having the largest molecular mass will be cracked (most likely by shockwaves) first inside the nozzle reactor. Introducing at least a fraction of the residual oil into the nozzle reactor in a liquid phase may thereby ensure that the liquid fraction will be cracked before any gaseous fraction of the residual oil introduced into the nozzle reactor. Accordingly, the temperature of residual oil may be adjusted such that at least a fraction of the residual oil is injected into the nozzle reactor in a liquid phase. The temperature to which the residual oil is adjusted is not limited, and may vary based on the properties of the residual oil, including the various boiling points of the different fractions of the residual oil.

The cracking material may be any suitable material as described in greater detail above. In some embodiments, the cracking material is steam.

In some embodiments, the method may include a recycle step. More specifically, any residual oil that exits the nozzle reactor uncracked may be recycled back to the second material feed port. In this manner, the uncracked residual oil undergoes an additional pass through the nozzle reactor, thereby increasing the overall efficiency of the nozzle reactor with respect to cracking of the residual oil. The uncracked residual oil may be passed back to the second material feed port in any suitable manner, such as by piping, and may include a pump to help transport the uncracked residual oil back to the second material feed port. The small amount of pitch that may be produced by the nozzle reactor may also be recycled back to other processing equipment located upstream of the nozzle reactor in the refining process. For example, where the nozzle reactor is located downstream of a hydrocracker or a coker and generally receives the residues from these processing units, the small amount of pitch material produced by the nozzle reactor may be recycled back to the hydrocracker or the coker. The coke precursor carbon, also known as Conradson Carbon, disappears when hydrocarbon material is fed through a nozzle reactor, thus resulting in an absence of coke precursor carbon in the small amount of pitch produced by the nozzle reactor. As such, this material may be recycled back to a hydrocracker or coker, and processing of this material in the hydrocracker or coker is less likely to produce waste coke products. The recycle stream from a nozzle reactor may also blend back with the initial material fed into the refinery process. That is to say, the recycle stream may blend with material that has not undergone any refinery processing. The blend of the recycle stream and the initial material may then undergo refinery processing steps.

The recycle stream may be pre-heated prior to injecting the recycle stream into the nozzle reactor or upstream processing units as discussed in greater detail above. More specifically, if the recycle stream is blended with material that has not been at least partially preheated, then the combined stream may be preheated prior to being introduced into the nozzle reactor or upstream processing units. The temperature to which the blended material is pre-heated may generally be any suitable temperature for facilitating cracking of the blended material inside the nozzle reactor or processing the blended material in upstream processing units. In some embodiments, the blended material may be pre-heated to a range of from 300 deg C. to 440 deg C. If the recycle stream is injected directly into the nozzle reactor or upstream processing unit without blending, then the recycle stream may not need to be preheated. This is because the recycle stream may already be at the temperature to which material fed into the nozzle reactor or upstream processing unit is pre-heated.

In some embodiments, a method of modifying a refinery plant including at least one of a coker, a hydrocracker, and a deasphalting unit is disclosed. The method may generally include replacing a coker, a hydrocracker, and/or a deasphalting unit with a nozzle reactor as disclosed herein. Substituting a coker, a hydrocracker, and/or a deasphalting unit with a nozzle reactor may beneficially improve the conversion of the residual oil into light hydrocarbons. For example, cokers generally convert up to 60 wt-% of residual oil and hydrocrackers generally convert 75 wt-% of residual oil, while a nozzle reactor may convert as much as 95 wt-% of the residual oil.

Substituting the nozzle reactor for at least one of a coker, a hydrocracker, and a deasphalting unit may be carried out by any suitable procedure for disconnecting at least one the coker, hydrocracker, and deasphalting unit from the refinery process and connecting the nozzle reactor to the refinery process. Generally speaking, substitution may only require diverting the stream normally fed to at least one of the coker, hydrocracker, and/or deasphalting unit to, for example, the second material feed port of a nozzle reactor. In this manner, the feed stream for at least one of a coker, hydrocracker, and/or deasphalting unit may be fed into the reactor body of the nozzle reactor where a cracking gas will work to crack the heavy hydrocarbons in the feed stream.

The nozzle reactor may generally include a nozzle reactor according to any embodiment or aspect of the nozzle reactors described in greater detail above. In some embodiments, the nozzle reactor may include a reactor body, a first material injector, and a second material feed port. The reactor body may include a reactor body passage with an injection end and an ejection end. The first material injector may include a first material injection passage and may be mounted in the nozzle reactor in material injecting communication with the injection end of the reactor body. Furthermore, the first material injection passage may have an enlarged volume injection section, an enlarged volume ejection section, and a reduced volume mid-section intermediate the enlarged volume injection section and enlarged volume ejection section. The first material injection passage may also have a material injection end and a material ejection end in injecting communication with the reactor body passage. The second material feed port may penetrate the reactor body. The location of the second material feed port may be adjacent to the material ejection end of the first material injection passage and transverse to a first material injection passage axis extending from the material injection end and material ejection end in the first material injection passage in the first material injector. Other features of the nozzle reactor are described in greater detail above.

A nozzle reactor may replace any type of coker, hydrocracker, or deasphalting unit. For example, the nozzle reactor may replace a delayed coker, a fluid, coker or a flexicoker. The nozzle reactor may also replace a ROSE™ deasphalting unit.

The nozzle reactor used in place of at least one of the coker, hydrocracker and/or deasphalting unit may produce a small quantity of pitch by-product. The pitch by-product may be recycled back into the nozzle reactor via, for example, the second material feed port. Such a recycle stream is not possible in, for example, a coker, since it is difficult for a coker to process the very stable coke.

In some embodiments, the small amount of pitch by-product that may be produced by the nozzle reactor may be recycled back to any of the at least one coker, hydrocracker or solvent deasphalting unit that has not been replaced in the system by a nozzle reactor. For example, in a refining process having a coker and a hydrocracker and where only the hydrocracker is replaced with a nozzle reactor, the pitch by-product that may be produced by the nozzle reactor may be recycled back to the coker.

If such a pitch by-product is not recycled back into the nozzle reactor or a remaining coker, hydrocracker or deasphalting unit, the pitch by-product may still be used for steam generation, such as the steam that may be used as a cracking material in the nozzle reactor. Unrecycled pitch by-product may also be further processed to generate asphalt product that may be used for road surfacing, roof shingle production, and other products utilizing asphalt.

With respect to replacing cokers, the use of a nozzle reactor may include the added benefit of producing a stable product. Generally speaking, cokers produce highly olefinic and hence very unstable products. These materials generally need an immediate hydrotreating step to produce a more stable product. To the contrary, the nozzle reactor produces products that are stable and do not require any further processing before transport to a final product production facility. Furthermore, the gas produced in the nozzle may be less than 10% of what a coker produces, which results in environmental advantages. Also, as noted above, cokers generally do not allow for the recycle of stable coke produced by the coker, which thereby drastically reduces the total liquid product yield possible in a coker.

With respect to replacing hydrocrackers, the use of a nozzle reactor may include the added benefit of being less expensive and less complex than a traditional hydrocrackers. Moreover, unlike the hydrocrackers, no hydrogen is necessary in operation of the nozzle reactor while still producing a stable product.

With respect to replacing deasphalting units, the use of a nozzle reactor may include the added benefit of limiting or eliminating the need to dispose of asphaltene waste. Refineries using deasphalting units typically have to pay to dispose of these hydrocarbon wastes, but this material can readily be further processed through the nozzle reactor. Replacing a deasphalting unit with a nozzle reactor may also increase the versatility of a refinery plant normally employing a deasphalting unit. Typically, deasphalting units are used in light oil refineries. These light oil refineries are not capable of processing heavy oil due to the heavy waste components found therein. However, when a nozzle reactor is used to replace a deasphalting unit, the light oil refinery obtains the ability to process the heavy oil it previously could not. Deasphalting units such as those performing the ROSE™ process may be eliminated from the refinery by substituting a nozzle reactor and a vacuum distillation tower while also expanding the ability of the refinery to handle different types of material.

In a refinery plant including any combination of a coker, a hydrocracker, and a deasphalting unit, the method of modifying the refinery plant may include replacing any combination of the units with one or more nozzle reactors. The units (i.e., the coker, hydrocracker, and deasphalting unit) may be replaced with a nozzle reactor at a 1:1 ratio (i.e., one nozzle reactor for each unit replaced). Furthermore, one coker, one hydrocracker, and/or one deasphalting unit may be replaced with multiple nozzle reactors.

In some embodiments disclosed herein, one or more nozzle reactors may be used in conjunction with existing cokers, hydrocrackers, or deasphalting units. For example, where the capacities of the existing cokers, hydrocrackers, or deasphalting units are limited, nozzle reactors may be added to increase the overall capacity of the refinery.

In some embodiments, a refinery plant utilizing the nozzle reactors described herein is disclosed. The refinery plant may generally utilize a refinery residue-producing processing unit having a refinery residue outlet and a nozzle reactor. The refinery residue outlet of the refinery residue-producing processing unit may be fluidly connected to the nozzle reactor such that refinery residue leaving the refinery residue-producing processing unit may be fed into the reactor body of the nozzle reactor for cracking with cracking material.

The refinery plant may generally be any type of refinery plant used for processing of heavy hydrocarbon material, such as heavy oil, bitumen and crude oil, into useful, lighter hydrocarbon materials. The refinery plant may therefore also include any additional units needed for the processing of heavy hydrocarbon material. The refinery plant may include at least one of a coker, a hydrocracker, and a deasphalting unit, although in some embodiments, the refinery plant excludes these units. In their place, the refinery plant may utilize one or more nozzle reactors to crack feeds typically sent to a coker, hydrocracker, or deasphalting unit.

The refinery residue-producing processing unit of the refinery plant may be any type of refinery residue-producing processing unit used in heavy hydrocarbon processing. Examples of refinery residue-producing processing unit that may be included in the refinery plant include, but are not limited to, distillation units, vacuum stripping units, hydrocrackers, cokers, and deasphalting units. The refinery plant may include more than one refinery residue-producing processing unit and may include more than one type of refinery residue-producing processing unit. As noted above, the refinery residue-producing processing unit may include a refinery residue outlet. The refinery residue outlet may be the outlet for the residue portion of the feed stream fed to the refinery residue-producing processing unit The refinery residue may be as described above in the previous embodiment, and therefore generally includes the remainder of any stream of material fed to a unit of a refinement process after removal of a part or parts of the stream of material.

The nozzle reactor used in the refinery plant may generally have a nozzle reactor according to any embodiment or aspect of the nozzle reactors described in greater detail above. In some embodiments, the nozzle reactor may have a reactor body, a first material injector, and a second material feed port. The reactor body may have a reactor body passage with an injection end and an ejection end. The first material injector may have a first material injection passage and may be mounted in the nozzle reactor in material injecting communication with the injection end of the reactor body. Furthermore, the first material injection passage may have an enlarged volume injection section, an enlarged volume ejection section, and a reduced volume mid-section intermediate the enlarged volume injection section and enlarged volume ejection section. The first material injection passage may also have a material injection end and a material ejection end in injecting communication with the reactor body passage. The second material feed port may penetrate the reactor body. The location of the second material feed port may be adjacent to the material ejection end of the first material injection passage and transverse to a first material injection passage axis extending from the material injection end and material ejection end in the first material injection passage in the first material injector. Other features of the nozzle reactor are described in greater detail above.

As noted above, the refinery residue-producing processing unit may include a refinery residue outlet and the refinery residue outlet may be in fluid communication with nozzle reactor such that refinery residue leaving the refinery residue-producing processing unit via the refinery residue outlet may be injected into the reactor body of the nozzle reactor for cracking with cracking material. In some embodiments, the refinery residue outlet may be in fluid communication with the second material feed port of the nozzle reactor. In some embodiments, the refinery residue outlet may be in fluid communication with the first material injector. Fluid communication between the refinery residue-producing processing unit and the nozzle reactor may be achieved by any suitable means. For example, the fluid communication may be achieved via a pipe running between the two units.

As with other embodiments described above, the nozzle reactor may also include a recycle stream so that any material leaving the nozzle reactor may be fed back to the nozzle reactor. The material that may be recycled back into the nozzle reactor may include cracked material, uncracked material, or pitch by-product. The recycle stream may connect with the refinery residue stream being fed to the nozzle reactor or may recycle back to a different inlet near the injection end of the reactor body of the nozzle reactor. A recycle stream of material leaving the nozzle reactor may also be recycled back to an upstream processing unit in the refinery plant. In some embodiments, a light product stream of the nozzle reactor may be recycled all the way back to the feed stream initially entering the refinery system, such as prior to being introduced into a distillation unit. In an alternate embodiment, pitch by-product produced by the nozzle reactor may be recycled back to a coker, hydrocracker or other processing unit.

The refinery residue may notbe pre-heated prior to being injected into the nozzle reactor. The refinery residue leaving the refinery residue-producing processing unit may already be at a temperature suitable of injection into the nozzle reactor. For example, refinery residue such as distillation tower bottoms leave the distillation towers at a high temperature, and therefore may be injected into the nozzle reactor without a pre-heating step. In some cases, the refinery residue may be cooled before introduction into the nozzle reactor. For example, LC Finer bottoms may be cooled when valuable syncrude or virgin oil is blended into the bottoms to make transportation feasible. The discharge temperature of the hydrocracker furnace (~525 deg C.) is higher than the feed for the nozzle reactor (~425 deg C.).

Figure 9:
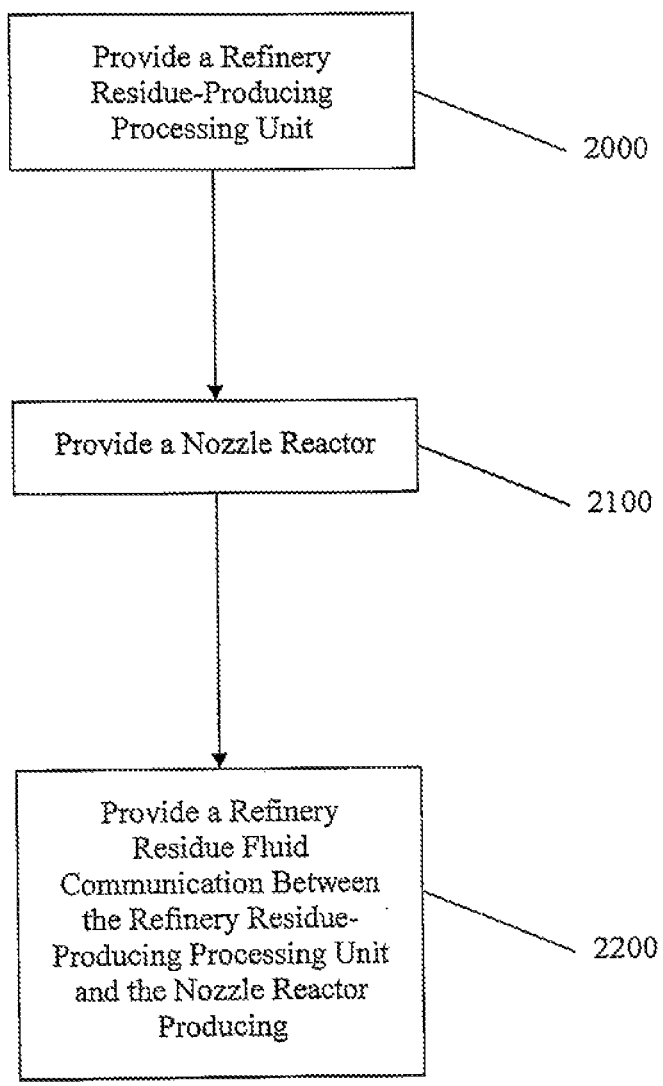
FIG. 9 is a flow diagram illustrating a method of assembling a refinery plant according to embodiments disclosed herein.

In some embodiments, a method of assembling a refinery plant is disclosed. With reference to FIG. 9, the method may generally include the steps of providing a refinery residue-producing processing unit 2000, providing a nozzle reactor 2100, and providing refinery residue fluid communication between the refinery residue outlet of the refinery residue-producing processing unit and the second material feed port of the nozzle reactor 2200. More specifically, the refinery residue-producing processing unit may have a refinery residue outlet and the nozzle reactor may have a second material feed port. The fluid communication between the refinery residue-producing processing unit and the nozzle reactor may be provided by connecting the refinery residue outlet of the refinery residue-producing processing unit with the second material feed port of the nozzle reactor.

The refinery plant to be assembled may generally be any type of refinery plant used for processing of heavy hydrocarbon material, such as heavy oil, bitumen and crude oil, into useful, lighter hydrocarbon materials. The refinery plant being assembled may therefore also include any additional units needed for the processing of heavy hydrocarbon material.

The refinery residue-producing processing unit provided as part of the method of assembling the refinery plant may be any type of refinery residue-producing processing unit used in hydrocarbon processing. Examples of refinery residue-producing processing unit may include distillation units and deasphalting units. The distillation units that may be included in the refinery plant include, but are not limited to, atmospheric distillation units and vacuum distillation units. The refinery plant may include more than one refinery residue-producing processing unit and may include more than one type of refinery residue-producing processing unit. As noted above, the refinery residue-producing processing unit may include a refinery residue outlet. The refinery residue outlet may be the outlet for the residue portion of the feed stream fed to the refinery residue-producing processing unit that is not separated from the feed stream.

The step of providing a refinery residue-producing processing unit may include, but is not limited to, partially or wholly constructing the refinery residue-producing processing unit or obtaining the refinery residue-producing processing unit from a third party, such as via a sale, donation or lease of the equipment.

The nozzle reactor used in the refinery plant may generally have a nozzle reactor according to any embodiment or aspect of the nozzle reactors described in greater detail above in some embodiments, the nozzle reactor may include a reactor body, a first material injector, and a second material feed port. The reactor body may have a reactor body passage with an injection end and an ejection end. The first material injector may have a first material injection passage and may be mounted in the nozzle reactor in material injecting communication with the injection end of the reactor body. Furthermore, the first material injection passage may have an enlarged volume injection section, an enlarged volume ejection section, and a reduced volume mid-section intermediate the enlarged volume injection section and enlarged volume ejection section. The first material injection passage may also have a material injection end and a material ejection end in injecting communication with the reactor body passage. The second material feed port may penetrate the reactor body. The location of the second material feed port may be adjacent to the material ejection end of the first material injection passage and transverse to a first material injection passage axis extending from the material injection end and material ejection end in the first material injection passage in the first material injector. Other features of the nozzle reactor are described in greater detail above.

The step of providing a nozzle reactor may include partially of wholly constructing the nozzle reactor or obtaining the nozzle reactor from a third party, such as via a sale, donation or lease of the equipment.

The step of providing refinery residue fluid communication between the refinery residue outlet of the refinery residue-producing processing unit and the second material feed port of the nozzle reactor may be accomplished by any suitable means for allowing refinery residue from the refinery residue-producing processing unit to travel into the reactor body of the nozzle. An example of providing such a fluid communication may be by providing piping between the refinery residue outlet of the refinery residue-producing processing unit and the second material feed port of the nozzle reactor. Such fluid communication, may include allowing the refinery residue to travel through the pipe via gravity or through the use of a pump.

Providing refinery residue fluid communication between the refinery residue outlet and the second material feed port may also allow for the addition of other streams to the fluid communication provided between the refinery residue-producing processing unit and the nozzle reactor. For example, where piping is used to provide the fluid communication, the piping between the refinery residue-producing processing unit and the nozzle reactor may receive other piping that delivers additional components to the refinery residue stream traveling to the nozzle reactor. Such components may include, but are not limited to, a solvent to decrease the viscosity of the refinery residue or a recycle stream returning uncracked refinery residue that has passed through the nozzle reactor back to the second material feed port. Other chemicals, reagents and or hydrocarbons may also be added to enhance the uptake of hydrogen from the first material into the second material.

In some embodiments, fluid communication may be provided between two or more refinery residue-producing processing units and a nozzle reactor or between a refinery residue-producing processing unit and two or more nozzle reactors. For example, providing the fluid communication may include piping that branches in order to either split the refinery residue stream so that it may be injected into multiple nozzle reactors or by joining together several refinery residue streams from different refinery residue-producing processing unit to travel to one nozzle reactor. As such, the nozzle reactor may receive a refinery residue stream including refinery residue from both a different types of refinery residue-producing processing unit, such as from a vacuum distillation column and an atmospheric distillation column.

EXAMPLES

Background Example

A conventional refinery includes four separate hydrocarbon processing units:

1. A Distillation Unit (DU)
2. A Fluid Catalytic Cracker (FCC)
3. A Hydrotreater
4. Coker Cold Lake bitumen is fed to the Distillation Unit where the bitumen feed is fractionated as follows:

| | |
|---|---|
| 20.8% | light fraction (boiling point <700 deg F.) |
| 24.2% | mid-distillate fraction (boiling point between 700 and 1050 deg F.) |
| 54.9% | bottoms fraction (boiling point >1050 deg F.). |
| 100% | Total |

The bottoms fraction (54.9%) is fed to a coker, which converts the bottoms as follows:

| | |
|---|---|
| 18.4% | petroleum cokes for disposal |
| 11.7% | heavy coker oil (HCO) |
| 19.9% | light gas oil |
| 4.9% | gas |
| 54.9% | Total |

The HCO (11.7%) from the coker is joined with the mid-distillate fraction (24.2%) from the distillation unit, and the mixture (35.9% total) is fed to the Fluid Catalytic Cracker. In the FCC, the mixture is cracked into the following products:

| | |
|---|---|
| 5.0% | marketable fuel oil |
| 7.8% | combined gas (5.6%) and FCC cokes (2.2%) |
| 23.1% | liquid product |
| 35.9% | Total |

The FCC liquid product (23.1%) joins the coker light gas oil (19.9%) and Distillation Unit light fraction (20.8%) as feed (total 63.8%) to the hydrotreater, where all feed is converted into light products. The following overall balance is the result:

| | |
|---|---|
| Bitumen Feed | 100.0% |
| Hydrotreater Light Product | 63.8% |
| FCC Marketable Fuel Oil | 5.0% |
| Cokes: | 20.6% |
| Gases: | 10.5% |
| | 100% |

Example A

A modified refinery can have four separate hydrocarbon processing units, where a Nozzle Reactor System replaces the traditional coker:

1. A Distillation Unit (DU)
2. A Fluid Catalytic Cracker (FCC)
3. A Hydrotreater, and
4. A Nozzle Reactor System (NRS)

Cold Lake bitumen is fed to the Distillation Unit where the bitumen feed is fractionated as follows:

| | |
|---|---|
| 20.8% | light fraction (boiling point <700 deg F.) |
| 24.2% | mid-distillate fraction (boiling point between 700 and 1050 deg F.) |
| 54.9% | bottoms fraction (boiling point >1050 deg F.). |
| 100% | Total |

The DU bottoms fraction (54.9%) is fed to a Nozzle Reactor System and is converted into the following products:

| | |
|---|---|
| 7.4% | NRS liquid pitch for further processing or disposal |
| 22.8 | NRS mid-distillate |
| 24.7% | liquid pitch stream (recycled back to DU) |
| 54.9% | Total |

The NRS mid-distillate (30.9%) joins the DU mid-distillate (24.2%) as feed stock (55.1% total) for the Fluid Catalytic Cracker. In the FCC, the feed stock is cracked into the following products:

| | |
|---|---|
| 6.0% | fuel oil (recycled back to the NRS for further cracking) |
| 9.8% | combined gas (7.8%) and FCC cokes (2.0%) |
| 39.2% | liquid product |
| 55.1% | Total |

The FCC liquid product (39.2%) joins the NRS mid-distillate product (22.8%) and Distillation Units light fraction (20.8%) as feed (total 82.8%) to the hydrotreater where all is converted into light products. The following overall balance is the result:

| | |
|---|---|
| Bitumen Feed | 100.0% |
| Hydrotreater Light Product | 82.8% |
| FCC Cokes: | 2.0% |
| Gases: | 7.8% |
| NRS Liquid Pitch | 7.4% |

Comparing Background Example (coking) with Example A (nozzle reactor), a nozzle reactor system will produce 29.6% more valuable product than a coker unit operation will generate. Furthermore the nozzle reactor system also produces less gas and a liquid pitch product that can be further processed if needed. The reduction in the amount of cokes can be an advantage to the system described in Example A, as it is well known that the disposal of solid petroleum coke can present an environmental problem.

Example B

Distillation bottoms comprising hydrocarbons having predominantly molecular weights in the range of ~300 to ~4,000 are adjusted to a temperature of 425 deg C. The distillation bottoms are injected into a nozzle reactor via the second material feed port of the nozzle reactor. Simultaneously, superheated steam at a temperature of about 1250 deg F. is injected into the converging section of the nozzle of the nozzle reactor at a flow rate of about 1.5 times the flow rate of the distillation bottoms into the nozzle reactor. The distillation bottoms and steam are retained inside the nozzle reactor for a period of time around 0.6 seconds. Shockwaves produced inside the nozzle convert approximately 45% of the distillation bottoms having a boiling point above 1050 deg F. into lighter hydrocarbons having a boiling point less than 1050 deg F. The nozzle reactor emits a mixture of steam, cracked, and uncracked hydrocarbons at a temperature of about 400 deg C.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method of cracking residual oil, the method comprising:
   providing a nozzle reactor, the nozzle reactor comprising:
      a reactor body having a reactor body passage with an injection end and an ejection end;
      a first material injector having a first material injection passage and being mounted in the nozzle reactor in material injecting communication with the injection end of the reactor body, the first material injection passage having (a) an enlarged volume injection section, an enlarged volume ejection section, and a reduced volume mid-section intermediate the enlarged volume injection section and enlarged volume ejection section, (b) a material injection end, and (c) a material ejection end in injecting communication with the reactor body passage; and
      a second material feed port penetrating the reactor body and being (a) adjacent to the material ejection end of the first material injection passage and (b) transverse to a first material injection passage axis extending from the material injection end and material ejection end in the first material injection passage in the first material injector;
   injecting a stream of cracking material through the first material injector into the reactor body;
   injecting residual oil through the second material feed port into the reactor body and transverse to the stream of cracking material entering the reactor body from the first material injector to produce cracked residual oil and uncracked residual oil; and
   recycling the uncracked residual oil to a coker or hydrocracker located upstream of the nozzle reactor.

2. The method of cracking residual oil as claimed in claim 1, wherein the residual oil comprises hydrocarbons separated from a hydrocarbon source and having a molecular weight greater than 300.

3. The method of cracking residual oil as claimed in claim 2 wherein the hydrocarbon source comprises heavy oil.

4. The method of cracking residual oil as claimed in claim 3, wherein the heavy oil comprises bitumen.

5. The method of cracking residual oil as claimed in claim 1, wherein the residual oil comprises distillation bottoms, asphaltenes, or stripped hydrocarbon material.

6. The method of cracking residual oil as claimed in claim 5, wherein the residual oil comprises distillation bottoms and the distillation bottoms comprise atmospheric distillation bottoms, vacuum distillation bottoms, or a combination thereof.

7. The method of cracking residual oil as claimed in claim 1, wherein the cracking material comprises steam.

8. The method of cracking residual oil as claimed in claim 1, wherein the enlarged volume injection section, reduced volume mid-section, and enlarged volume ejection section in the first material injection passage cooperatively provide a substantially isentropic passage for a first material feed stock through the first material injection passage.

9. The method of cracking residual oil as claimed in claim 1, wherein the reactor body passage has a varying cross-sectional area and wherein the cross-sectional area of the reactor body passage either maintains constant or increases between the injection end and the ejection end of the reactor body passage.

10. The method of cracking residual oil as claimed in claim 1, wherein the cracking material is accelerated to supersonic speed by the first material injection passage of the first material injector.

* * * * *